United States Patent [19]
Lee et al.

[11] Patent Number: 5,297,162
[45] Date of Patent: Mar. 22, 1994

[54] SYSTEM AND METHOD FOR BIT TIMING SYNCHRONIZATION IN AN ADAPTIVE DIRECT SEQUENCE CDMA COMMUNICATION SYSTEM

[75] Inventors: Edward K. B. Lee, Sunrise; Jimmy Cadd, Coral Springs; Tracy L. Fulghum; Robert S. Babayi, both of Sunrise, all of Fla.

[73] Assignee: Motorola, Inc., Schaumburg, Ill.

[21] Appl. No.: 73,226

[22] Filed: Jun. 4, 1993

[51] Int. Cl.⁵ ............................................. H04L 9/00
[52] U.S. Cl. ...................................... 375/1; 380/48; 380/49
[58] Field of Search ................. 375/1; 380/48, 49

[56] References Cited
U.S. PATENT DOCUMENTS

| Re. 32,905 | 4/1989 | Baran | 375/1 |
|---|---|---|---|
| 4,355,399 | 10/1982 | Timor | 375/1 |
| 4,583,090 | 4/1986 | Eden et al. | 375/1 |
| 4,617,674 | 10/1986 | Mangulis et al. | 375/1 |
| 4,901,307 | 2/1990 | Gilhousen et al. | 375/1 |
| 5,056,109 | 10/1991 | Cilhousen et al. | 375/1 |
| 5,109,390 | 4/1992 | Gilhousen et al. | 375/1 |

OTHER PUBLICATIONS

Madhow, U., Honig, M. L., "Minimum Mean Squared Error Interference Suppression for Direct Sequence Spread-Spectrum Code-Division Multiple-Access," Proceeding of the 1st Intl. Conf. on Universal Personal Communication, Dallas, Sep. 1992.

Madhow, U., Honig, M. L., Bell Communications Research, "Error Probability and Near-Far Resistance of Minimum Mean Squared Error Interference Suppression Schemes for CDMA," IEEE, #0-7803-0608, Feb. 1992, pp. 1339-1343.

Cook, C. E., Marsh, H. S., "An Introduction to Spread Spectrum," IEEE #0163-6804-83/-300-0008, Mar. 1983, pp. 8-16.

*Primary Examiner*—David C. Cain
*Attorney, Agent, or Firm*—Robert S. Babayi

[57] ABSTRACT

In a CDMA communication system (100) capable of communicating between a receiver (20) and a transmitter (10) direct sequence spread spectrum communication signals (30), a system and method for synchronizing receiver bit timing and transmitter timing. Transmitter (10) transmits a training bit sequence (31) followed by a transmitter bit timing sequence (33). The receiver (20) adaptively determines a representation of a despreading chip sequence using a tapped delay line equalizer (400). Receiver bit timing offset is determined based on the representation of the despreading chip sequence and the transmitter bit timing sequence (33).

20 Claims, 6 Drawing Sheets

SYSTEM AND METHOD FOR BIT TIMING SYNCHRONIZATION IN AN ADAPTIVE DIRECT SEQUENCE CDMA COMMUNICATION SYSTEM

CROSS REFERENCE TO RELATED APPLICATIONS

This application is related to U.S. patent application "A System and Method for Chip Timing Synchronization in an Adaptive Direct Sequence CDMA Communication System" by Lee et al, Ser. No. 07/071,878, filed Jun. 7, 1993, and U.S. patent application "A Communication Method for an Adaptive Direct Sequence CDMA Communication System" by Lee et al., Ser. No. 08/071,879, filed Jun. 7, 1993, and both assigned to Motorola, Inc.

TECHNICAL FIELD

This invention relates in general to the field of communication methods and synchronization in data communication systems and more particularly to a direct sequence code division multiple access (DS-CDMA) communication system.

BACKGROUND

Code division multiple access (CDMA) communication systems are used extensively in satellite communications with military and commercial applications. These systems are also known as spread spectrum communication systems because the communicated information is spread over a wide allocated frequency spectrum. In CDMA communication systems the frequency spectrum can be reused multiple times.

Because CDMA modulation techniques are inherently more susceptible to fading conditions present at the terrestrial and land mobile environments, their application has been limited to satellite communications. However, with recent advancements in communication signal processing, CDMA communication systems are becoming increasingly popular in terrestrial land mobile communication environments as well. For example, recent developments have allowed CDMA systems to be used in cellular telephone communications environments.

In general, there are two CDMA types of communication systems. One is known as frequency hoping CDMA system where the wide allocated spectrum is divide into a substantial number of narrower frequency band and information signal is switched or "hoped" over these frequency bands in accordance with a predetermined code. The other CDMA system is known as a direct sequence CDMA communication system (DS-CDMA) where the user information signals in the form of binary bits are spread over the allocated frequency spectrum by combining them with spreading codes known as pseudorandom noise (PN) codes. The spreading code comprises a predetermined sequence of binary states known as chips. Thus, when combined, each user information bit interval gets coded with a spreading chip sequence. Conventionally, a DS-CDMA transmitter produces a direct sequence spread spectrum (DS-SS) communication signal by multiplying the user information bit sequences by the spreading chip sequence.

Once received at a receiving end, the DS-SS communication signal is decoded by multiplying the received signal by a despreading chip sequence having corresponding characteristics to the spreading chip sequence. In conventional DS-CDMA communication system, the receiver knows of the spreading chip sequence prior to start of a communication call. Thereafter, the receiver decodes the DS-SS communication signal based on the known spreading chip sequence.

It is well known that in the presence of many users CDMA receivers in addition to receiving the desired signal also receive many multiple-access interfering signals. In presence of multiple access interference, reliable communication may be achieved when interfering signals are received at approximately the same power level. When, there is a large disparity in received signal powers, non-zero crosscorrelations among the signals gives rises to a phenomenon known as near-far problem. In near-far situations, higher power interfering signals significantly degrade reception and decoding of a lower power desired transmission.

One conventional approach to improving the near far problem uses a power control scheme where the powers from the receivers are fed back and transmitter powers are controlled to substantially remove the power disparity. In another approach, PN codes are constructed such that they provide orthogonality between the user codes, thereby reducing mutual interference. This allows for higher capacity and better link performance. With orthogonal PN codes crosscorrelation is zero over a predetermined time interval resulting in no interference between the orthogonal codes provided only that the code time frames are aligned with each other.

In conventional CDMA communication systems the spreading chip sequence is either assigned by a self controller or it is pre-stored within the receiving unit. As such, during despreading and demodulation process, the receiver knows of the spreading chip sequence. A more recent approach for a CDMA receiver proposes an adaptive despreading or demodulating process. In an adaptive CDMA system, the receiver is enabled to suppress multiple access interference by an adaptive equalization process. In such a system, a CDMA transmitter transmits a training bit sequence which is coded with the spreading chip sequence and the receiver adaptively determines, based on the training sequence, the despreading code using a tapped delay line equalizer. Adaptive determination of the despreading chip sequence and suppression of multiple access interference allows significant number of users to communicate with each other over an spread spectrum channel without requiring central control infrastructure, and as such paving the way for infrastructureless communication systems.

However, in adaptive CDMA communication, the determined despreading chip sequence is not time synchronized with the transmitter because of certain time delays within the communication path or simply because the receiver does not know when bit and chip timing of the transmitter starts. Conventional methods of determining bit timing and chip timing offsets between the transmitter and receiver comprise performing correlation routines involving complex mathematical processing operations. These operations are time consuming and therefore delay establishment of communication link between transmitter and receiver. Therefore, there exists a need for a faster synchronization method which could be achieved in significantly shorter period of time than is achievable by conventional methods.

SUMMARY OF THE INVENTION

Briefly, according to the invention, there is provided a CDMA communication system capable of communicating DS-SS communication signals comprising binary bit sequences coded with a spreading chip sequence between a receiver and a transmitter. Receiver bit timing and transmitter bit timing are synchronized by transmitting a training bit sequence followed by a transmitter bit timing sequence. The receiver despreads the DS-SS communication signal to provide a decoded communication signal. The decoded communication signal is produced by adaptively determining an adaptive representation of a despreading chip sequence based on the training bit sequence using a tapped delay line equalizer. Thereafter, bit timing offset is determined based on the decoded communication signal sequence and the transmitter bit timing sequence.

DETAILED DESCRIPTION OF THE PREFERRED EMBODIMENT

Figure 1:
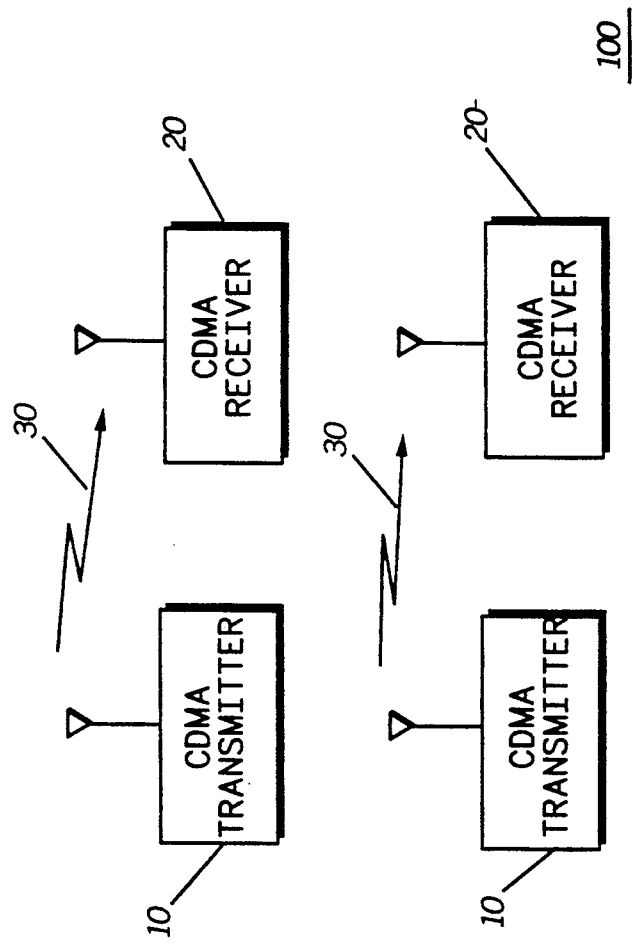
FIG. 1 is a diagram of a CDMA communication system according to present invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, a communication system 100 embodying the principles of the present invention is shown. The communication system 100 includes a plurality of CDMA transmitters 10 and a plurality of CDMA receivers 20 which communicate direct sequence spread spectrum (DS-SS) communication signals 30. The DS-SS communication signal 30 comprises a radio frequency communication signal modulated with binary bits coded with spreading chip sequence. The communication system 100 is an adaptive CDMA communication system whereby the despreading chip sequence is adaptively determined after the CDMA receivers 20 demodulates the DS-SS communication signal 30. As described later in detail, the receiver includes a tapped delay line equalizer which adaptively determines the despreading chip sequence during a training interval. Because the adaptive equalization is performed in presence of multiple access interfering signals, it adaptively produces the despreading chip sequence which suppresses the effects of the multiple access interference and decode the DS-SS communication signal 30. Once CDMA receivers 20 determines the despreading chip sequence communication between the CDMA transmitter 10 may be carried on based on the determined despreading chip sequence provided the bit timing and chip timing are synchronized.

In the present invention, the adaptive equalization during training is performed without bit timing or chip timing synchronization of the receiver and the transmitter. This is because performing synchronization of any kind in presence of interfering signals is close to impossible. Thus, a redundant training bit sequence is transmitted to circumvent the need for synchronization while the despreading chip sequence is being determined during training interval.

Figure 2:
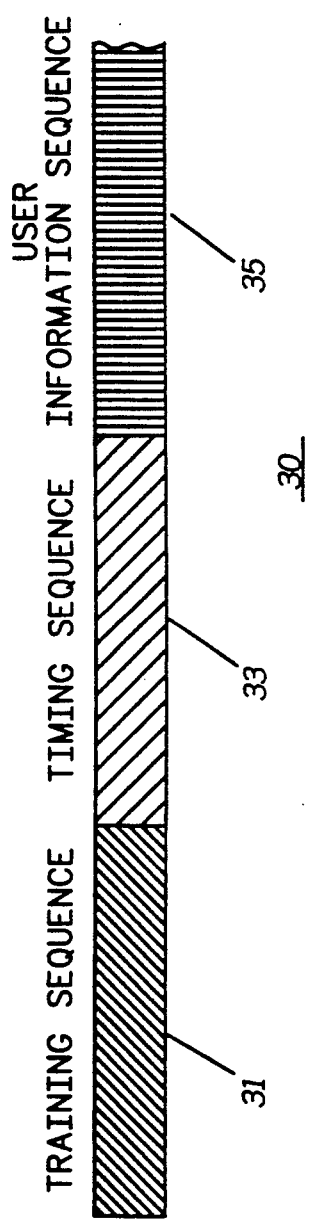
FIG. 2 is a timing diagram of a DS-SS communication signal according and present invention.

Referring now to FIG. 2, a timing diagram of the DS-SS communication signal 30 as transmitted by the transmitter 10 of FIG. 1 is shown. The DS-SS communication signal 30 comprises string of bits which are coded with a spreading chip sequence. The bits and the chips are binary signals assuming one of two states of $+1$ and $-1$ represented by voltage potentials of $V_{+1}$ and $V_{-1}$ respectively. The $V_{+1}$ and $V_{-1}$ potentials are of equal magnitude but opposite polarity. In this description it is assumed that $V_{+1}$ has a positive polarity and the $V_{-1}$ has a negative polarity. At the start of the DS-SS signal 30, a training sequence 31 is transmitted which is used by the receiver 20 to adaptively determine despreading chip sequence using a tapped delay line equalizer based on the training bit sequence. In the preferred embodiment of the invention, the training bit sequence comprises a predetermined redundant bit sequence having a non-alternating and continuous bit state, such as a sequence of consecutive $+1$ bit state. The training sequence 31 is followed by a transmitter bit timing sequence 33 which is used to synchronize receiver and transmitter bit timing. The transmitter bit timing sequence 33 is predetermined bit sequence having characteristics which gives the receiver information relating to the transmitter bit timing. As described later in detail, the transmitter bit timing sequence 33 comprises an alternating bit sequence having alternating bit states of both $+1$ and $-1$. Following the transmitter bit timing sequence 33, a user information sequence 35 comprising user generated data is transmitted. The user generated data carries the actual data for communication of which the transmission was initiated. The user generated data may for example be coded voice or raw binary data.

Figure 3:
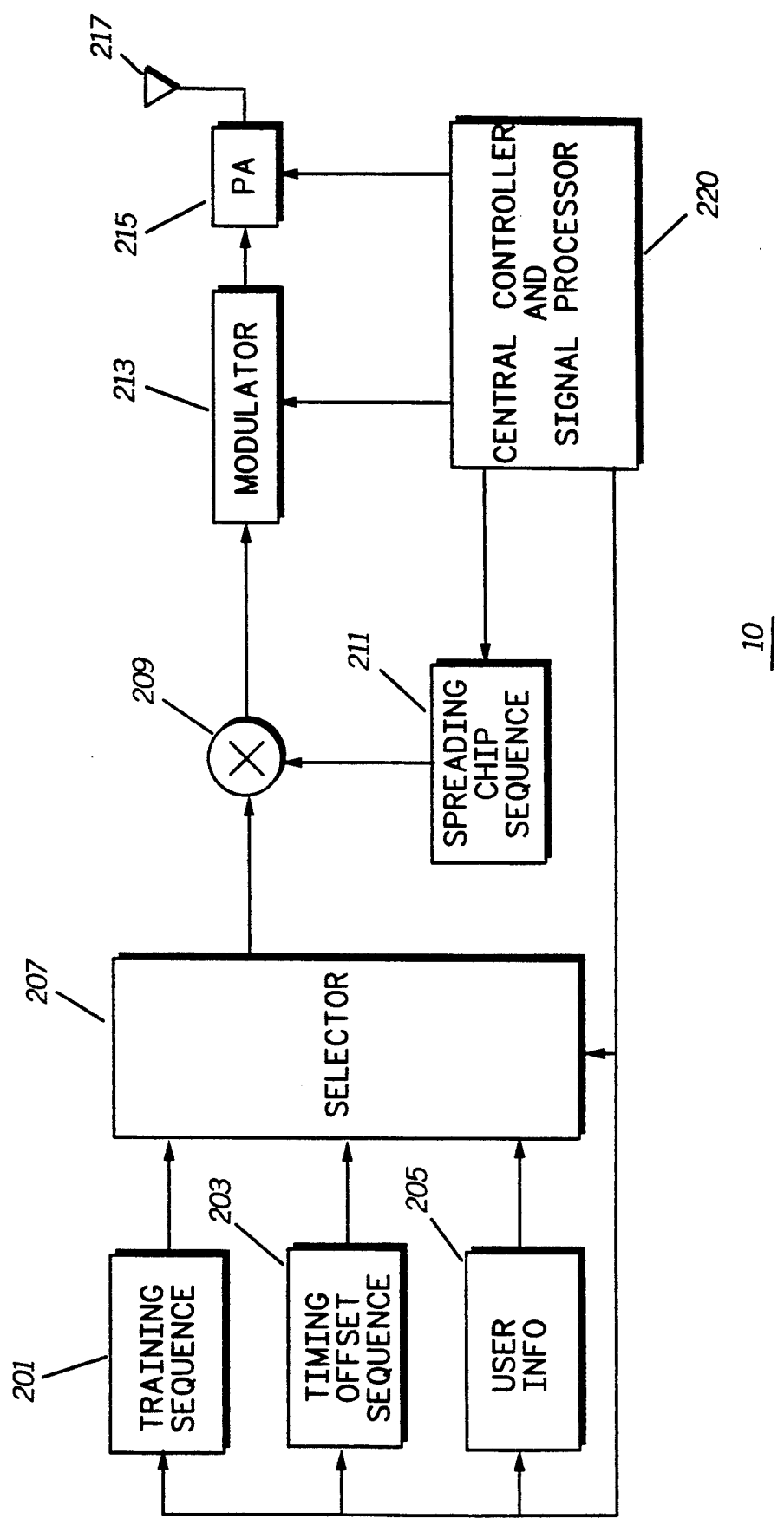
FIG. 3 is a block diagram of a CDMA transmitter used in communication system of FIG. 1.

Referring now to FIG. 3, a blocked diagram of the CDMA transmitter 10 is shown. The CDMA transmitter 10, includes a central controller and signal processor block 220, which controls the entire operation of the transmitter 10 including signal processing necessary for modulating and generating the spreading chip sequence. The transmitter 10, includes a training sequence block 201 which generates the predetermined training sequence. The transmitter 10 also includes a transmitter bit timing sequence generator block 203 which generates the transmitter bit timing sequence following the training sequence. Finally, a user information sequence block 205 provides user information in form of binary bit sequences. The user information may be originated from a variety of sources, such as from a voice coder which receives voice information from a microphone or it may comprise raw data information generated from a computing device. A selector block 207 under the control of the central controller and processor block 220 provides for selecting one of the training, bit timing or user information sequences in proper order and applies it to a multiplier 209. A spreading chip sequence generator block 211 generates the spreading chip sequence to be combined with the bit sequence to be transmitted to the receiver. Preferably, the generated spreading chip sequence comprise well-known gold PN codes having desirable crosscorrelation and auto-correlation properties. The spreading chip sequence has a predetermined number of chips (n) for coding each bit of the transmission sequences. The multiplier 209 multiplies one of the transmission sequences by the spreading chip sequence and applies it to a modulator 213. Modulator 213 may comprise a number of well known binary signal modulators, such as binary phase shift keying (BPSK) or quadrature phase shift keying (QPSK) modulators. Output of the modulator 213 is applied to a power amplifier 215 which amplifies the modulated signal and applies it to an antennae 217 for transmission. It may be appreciated that the block 220 and some of the other blocks described in conjunction with transmitter 10 maybe implemented utilizing one or more of well known digital signal processors, such as DSP 56000 series manufactured by Motorola Inc.

Figure 4:
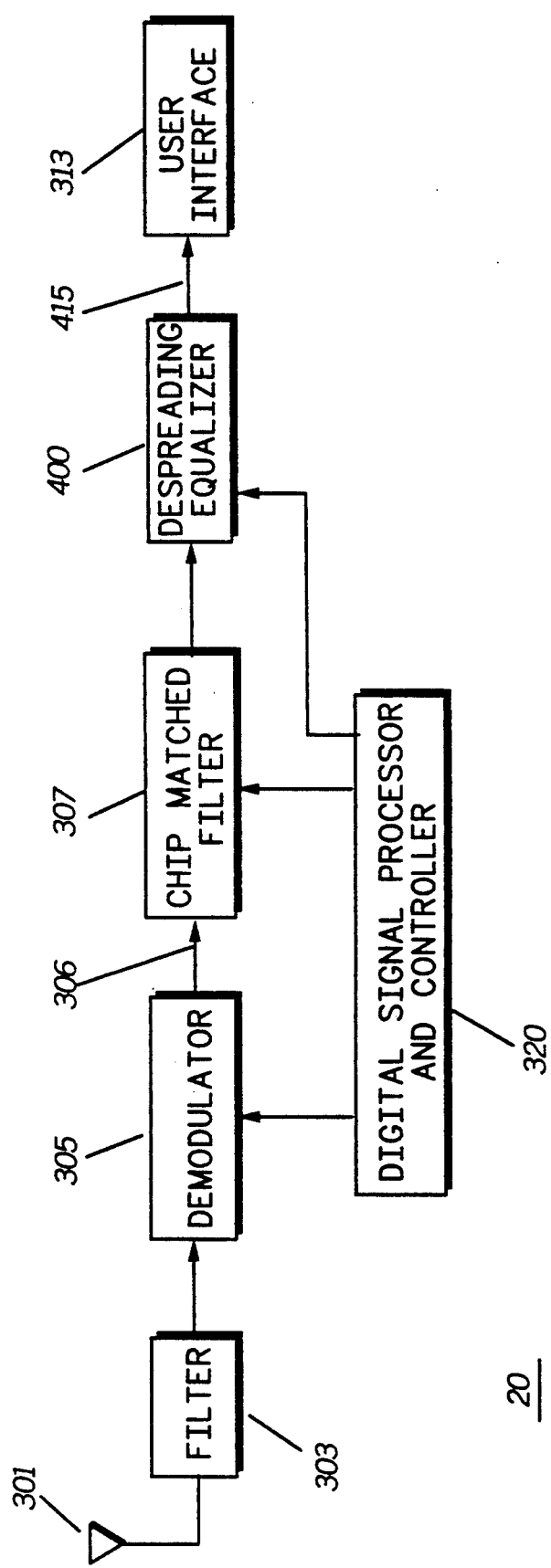
FIG. 4 is a block diagram of a CDMA receiver used in the communication system of FIG. 1.

Referring now to FIG. 4, the block diagram of the CDMA receiver 20 is shown. The spread spectrum communication signal is received at the antennae 301 and is applied to a preselector filter 303 which provides the initial receiver selectivity. The filtered signal is applied to a well known base band demodulator 305. The base band demodulator 305 comprises a well-known demodulator that demodulates the communication signal in accordance with the modulation scheme used in the transmitter 10 to provide a baseband signal 306. The base band signal 306 is applied to a well-known chip matched filter block 307. The chip matched filter comprises a well-known integrate-and-dump or a low pass filter block where the received DS-SS communication signal 30 is sampled and integrated at chip rate and the result is dumped at the end of each chip interval. The output of the chip matched filter is applied to a despreading equalizer 400, which, based on the training sequence adaptively determines a despreading chip sequence. As described later in detail, the despreading equalizer provides despreading chip sequence by adaptively equalizing the detected coded bits with an uncoded prestored signal corresponding to the training bit sequence. A signal processor and controlled block 320 performs all necessary signal processing requirements for the receiver 20. The equalizer 400 despreads the DS-SS communication signal 30 and provides a decoded communication signal at its output (415). The decoded communication signal is applied to a user interface block 313 which may comprise one of a number of user interface devices such as a speaker, a computing device, a data display or a fax or voice mail machine.

Figure 5:
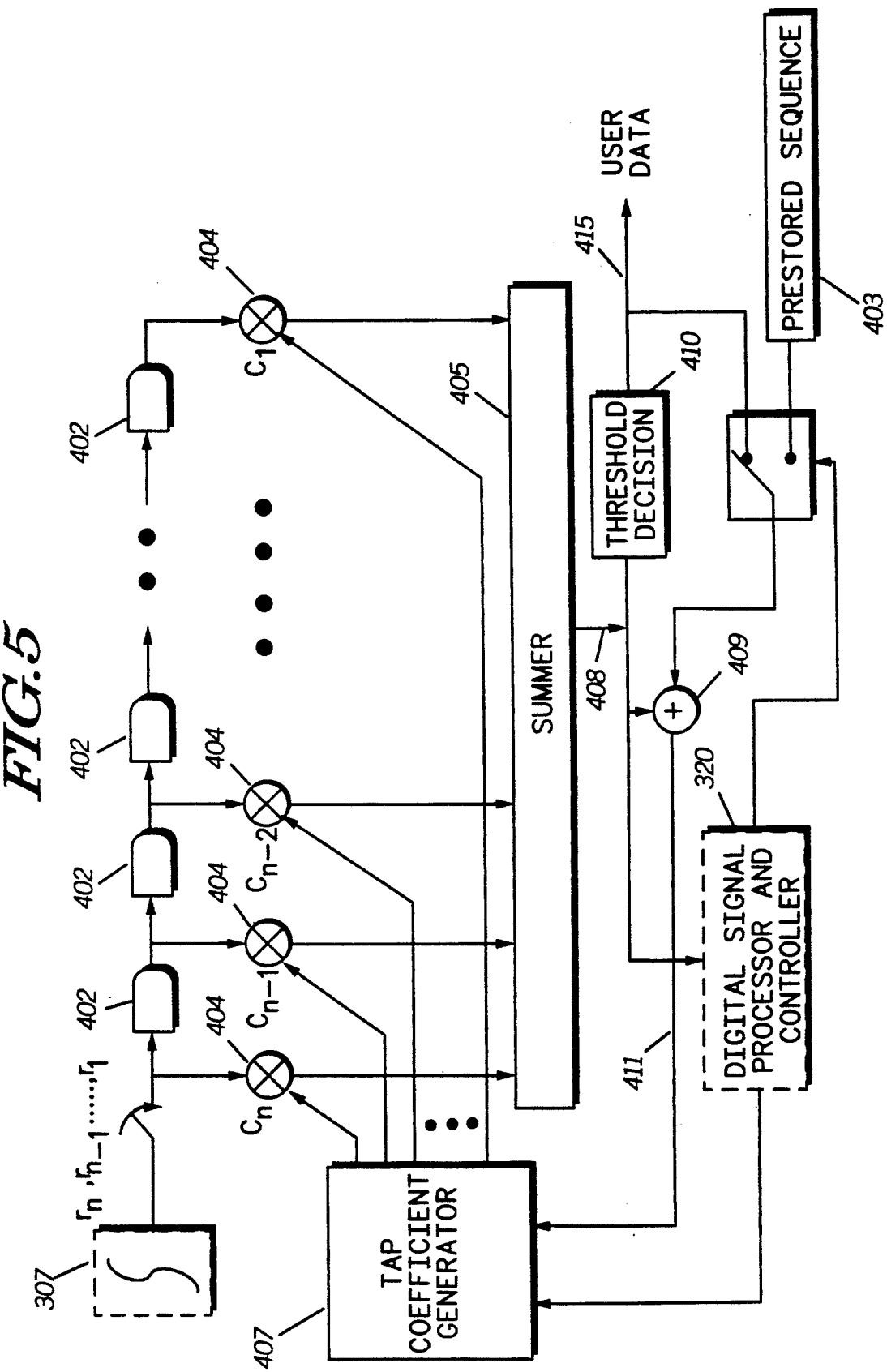
FIG. 5 is a block diagram of a spreading equalizer transmitter used in the receiver of FIG. 4.

Referring now to FIG. 5, a block diagram of the despreading equalizer 400 is shown. The equalizer 400 comprises an n-tap delay line equalizer where, as mentioned before, n is the number of chips per bit in the spreading chip sequence. The tap delay line consists of a bank of $n-1$ serially coupled flip-flops 402 with their outputs coupled to a corresponding number of multipliers 404. The bank of serially coupled flip-flops 402 operate as a shift register sequentially shifting, at the chip rate, sampled outputs of the chip matched filter 307, i.e., $(r_1-r_n)$ during each bit interval. At the end of each bit interval, the multipliers 404 multiply the flip-flop outputs with tap coefficients $C_1-C_n$ provided by a tap coefficient generator block 407. A summer 405 sums the outputs of the multipliers 404 to provide the summer output 408. As such, the summer output 408 represents integration of the multiplier outputs over one bit interval. The summer's output 408 is applied to a comparator 409 and a threshold decision block 410. The threshold decision block 410 comprises a threshold comparator which after training interval provides the detected bits of the user bit sequence. The threshold decision block 410 provides the equalizer output 415. The threshold detector decision block 410 determines the decoded bit state by comparing the summer output 408 with a bit state threshold level. It may be appreciated that the equalizer output 415 and the summer output 408 are related by having a (1/n) ratio therebetween.

During training, the comparator 409 compares the summer's output 408 with a pre-stored sequence as provided by a block 403. The pre-stored training sequences is a pre-determined signal representing uncoded training sequence. Therefore, the training sequence comprises a signal simulating uncoded redundant consecutive and non-alternating training bits. The comparator 409 compares the pre-stored training sequence with the summer output and provides an error signal 411 which is applied to a tap coefficient generator block 407. The tap coefficient generator blocks uses either the Least Means Square (LMS) or Recursive Least Square (RLS) algorithm to update tap coefficients $C_1-C_n$ once every bit interval in order to minimize the error signal 411. The despreading equalizer 400 updates the tap coefficient $C_1-C_n$ until the error signal between the detected bit sequence and the pre-stored training sequence is minimized. Hence, equalizing the summer output 408 with the output of the pre-store training sequence. As a result of equalizing the transmitted training bit sequence and the pre-stored sequence, the tap coefficients $C_1-C_n$ become a representative of the despreading chip sequence which despread the DS-SS communication signal 30 and suppress multiple-access interfering signals without prior knowledge of the spreading chip sequence. As such, the tap coefficients $C_1-C_n$ represent of the despreading chip sequence. These coefficients are used to despread the DS-SS communication signal 30 after the training interval has terminated.

Operationally, upon commencement of a transmission the receiver receives the training sequence 31 of the DS-SS communication signal 30 of FIG. 2. As mentioned, the training sequence comprises a bit sequence comprising non-alternating bit sequence, such as a bit sequence having continuous coded states of either +1 or −1. Commensurate with the training sequence, the pre-stored sequence also presents continuous uncoded states of either +1 or −1 during the training interval. When received, the training sequence is sampled at chip rate via the chip matched filter 307. The output of chip matched filter is applied to the tapped delay line equalizer 400 where through recursive iteration of updating the tap coefficients $C_1-C_n$ the pre-stored training bit sequence and detected bit sequence are equalized. When equalized, the produced tap coefficients $C_1-C_n$ result in decoding or despreading of the DS-SS communication signal 30 and elimination of the multiple access interfering signals. As such, the equalizer 400 produces tap coefficients $C_1-C_n$ which are a representation of the despreading chip sequence. Accordingly, the DS-SS communication signal 30 is decoded by adaptively determining a representation of the despreading chip sequence based on the training bit sequence.

After the despreading chip sequence is determined the resulting tap coefficients despread the received DS-SS communication signal while also eliminating the interfering signals. It may be appreciated that after the training interval the summer's output 408 at the end of each receiver bit interval represents ntegration of the decoded communication signal over that receiver bit interval. The integration, as herein described, constitutes summation of multiplication result during discrete chip intervals. Ideally, when the equalizing tap coefficients ($C_1$-$C_n$) are determined after training, their multiplication by the chip matched filter outputs ($r_1$-$r_n$) despreads or decodes the incoming DS-SS communication signal. Therefore, the summer's output 408 after each receiver bit interval is equal to the number of chips (n) multiplied by the bit potential of the decoded communication signal bit, i.e. $V_{+1}$, or $V_{-1}$ depending on the detected bit state, i.e., whether the detected bit comprises +1 or −1.

It may be appreciated that the tap delay line equalizer 400 could be implemented within the digital signal processor 320 of the receiver 20. As such the digital signal processor includes despreading means, determination means, comparison means and any and all other means necessary for processing and controlling to effectuate the required functions of the present invention as outlined in this specification. Alternatively the equalizer 400 may be implemented utilizing conventional digital and logical discrete components as is well known in the art.

Because of propagation delays and the fact that the receiver does not have any information relating to the start of a transmission, a probable discrepancy between the receiver and the transmitter timing may exist after completion of the training interval. This timing offset may exist both for chip timing and bit timing of the receiver. Therefore, the despreading chip sequence as provided by the tap coefficients $C_1$-$C_n$ may have to be synchronized for proper despreading of the DS-SS communication signal 30. In the adaptive CDMA communication system of the present invention, after the training interval, a chip timing offset estimation is made during a chip timing interval. This is because, as described hereinafter, the chip timing offset information could be extracted from the tap coefficients of the equalizer.

CHIP TIMING OFFSET

According to chip timing aspect of the present invention, the voltage potential or the energy stored in the tap coefficients $C_1$-$C_n$ includes chip timing information provided that the effects of the interfering multiple access signals are suppressed. As described before, the despreading chip sequence is represented by the tap coefficients $C_1$-$C_n$ and potentials thereof. In the communication system 100, the interfering signals are eliminated after the training interval and upon determination of the despreading chip sequence. Therefore, chip timing offset determination s commenced following the training interval to align receiver and transmitter chip timing. The chip timing offset determination process of the present invention could take place during one or more bit intervals after the final tap coefficients are determined.

Figure 6:
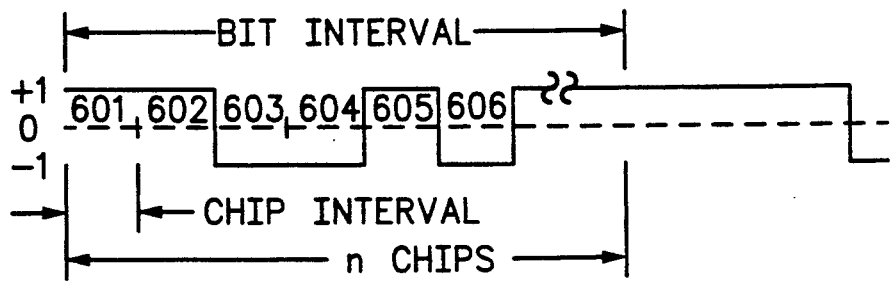
FIG. 6 is an exemplary timing diagram of a transmitter bit interval coded with a spreading chip sequence.

Referring now to FIG. 6, an exemplary chip sequence during one bit interval is shown. The chip sequence comprises n chips which assume one of two states +1 and −1. Because the outputs of the chip matched filter 305 ($r_1$-$r_n$) when sampled by the receiver contain information relating to the receiver and the transmitter chip timing offset and because the voltage potentials representing the tap coefficients are directly proportional to the energy of the received chips at the end of receiver chip intervals, the tap coefficient potentials are processed for determining the timing offset. Due to binary nature of the chip sequence, the ratio of the maximum potential of the outputs of the chip matched filter 307 to the minimum output potentials relates to the chip timing offset. According to the invention, the tap coefficients potentials can be divided into two set: one having maximum and another having minimum potentials. A first set of coefficient potentials corresponds to those having maximum potentials ($V_{max}$) and a second set of coefficient potentials corresponding to those having minimum potentials ($V_{min}$). It has been determined that the voltage potential of tap coefficients in second set change with respect to the tap coefficients in the second set by a factor of (1-2 a), where a represents the chip timing offset in terms of one chip interval. As such the following relationship exits between the chip timing offset and the tap coefficient voltage potentials:

$$a = \tfrac{1}{2} * (1 - |V_{min}|/|V_{max}|) \qquad \text{Eq. (1)}.$$

Therefore, by examining the tap coefficient potentials relating to each set the chip timing offset may be determined. It should be noted that in equation 1 the maximum potentials and the minimum potentials are expressed in terms of absolute values. Therefore, their polarity is irrelevant for determination of chip timing offset.

To illustrate the above concept, a number of exemplary situations where the receiver bit timing off set is equal to zero, $\tfrac{1}{4}$ chip interval, $-\tfrac{1}{4}$ chip interval and $-\tfrac{1}{2}$ of chip interval will be examined.

Figure 7:
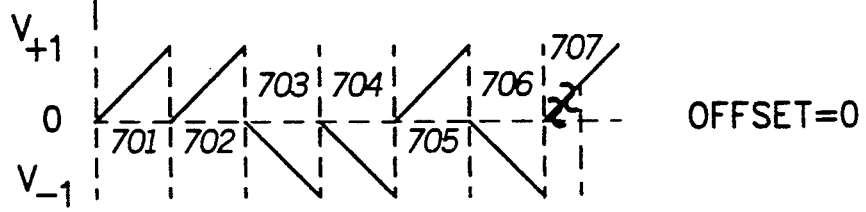
FIGS. 7-10 are exemplary timing diagrams showing effects of various chip timing offsets on output of a chip matched filter used in the receiver of FIG. 4.

FIG. 7 shows the output of the chip matched filter 307 as it samples at chip rate, integrates during the chip interval, and dumps at the end of the chip interval when the transmitter chip timing and receiver chip timing are synchronized, that is, chip timing offset =0. As shown, the output of the chip matched filter at the end of each intervals 701-707 has one of two equal but opposite potentials $V_{+1}$ and $V_{-1}$. The potentials correspond respectively to either of the +1 or −1 potential of the chip state. Because the sampled values $r_1$-$r_n$ are directly proportional to the tap coefficients C1-Cn, the absolute value of the first set of coefficient potentials, i.e., $|V_{max}|$, is equal to the absolute value of the second set of potentials, i.e., $|V_{min}|$. Therefore, the ratio of $|V_{min}|/|V_{max}|$ is equal to 1 resulting in a timing offset determination of a =0 according to equation 1. As such, the timing offset may be determined by processing the tap coefficient potentials at the end of each bit interval. It should be noted that $V_{max}$ (or $V_{min}$ for that matter) as referred herein could be considered as corresponding to either one of $V_{+1}$ or $V_{-1}$ since the absolute values of the $V_{max}$ or $V_{min}$ are of significance equation (1).

Figure 8:
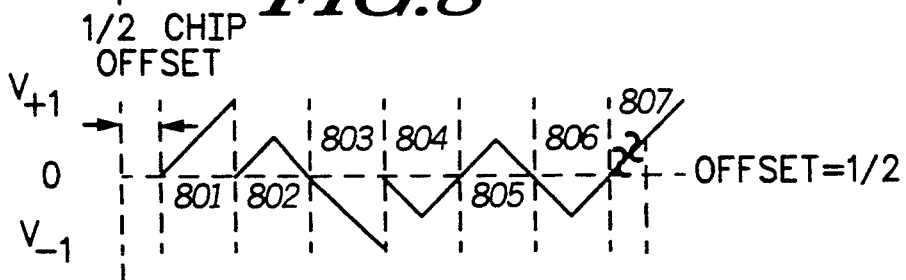

Referring to FIG. 8, a receiver chip timing offset of $\tfrac{1}{2}$ chip is assumed. That is, the chip interval 701 is half a chip off from the chip interval 801. As shown, the output of chip matched filter at the end of time interval 801 reaches $V_{+1}$. Then at the end of time interval 802 the chip matched filter output reaches a zero potential. At the end of chip interval 803, the output reaches $V_{-1}$. Again, at the end of chip intervals 804–806, the outputs are at zero. And finally at the end of interval 807 the output reaches $V_{+1}$. Accordingly, the first set of coefficient would have a potential $V_{max}$ which is equal to $V_{+1}$ (i.e., $V_{max} = V_{+1}$ (or $V_{-1}$)) and the second set of coefficients $V_{min}$ would have a potential equal to zero- (i.e., $V_{min} = 00$. Therefore, from equation (1) a chip timing offset of $a = \frac{1}{2}$ chip interval would result.

Figure 9:
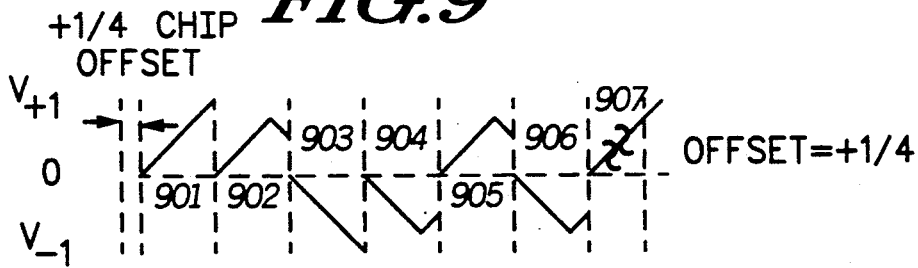

Referring to FIG. 9, a receiver chip timing offset of $+\frac{1}{4}$ is assumed. The positive sign of the chip timing offset signifies that the transmitter chip timing leads the receiver chip timing. That is, the transmitter chip timing reference starts prior to the receiver chip timing reference. Following the above analysis $V_{max}$ is equal to $V_{+1}$ (or $V_{-1}$) and $V_{min}$ is equal to $\frac{1}{2}$ of $V_{+1}$. As such, the equation (1) yields a timing offset $a = \frac{1}{4}$ chip timing.

The timing offset determined based on Equation (1), however, does not provide information relating to whether the timing offset is positive or negative. The sign of the timing offset indicates whether the receiver chip timing is leading or trailing the transmitter timing offset. According to the invention, the sign of information can be determined by examining the polarity and magnitude of successive tap coefficient potentials during one bit interval or two successive bit intervals. Therefore, once the absolute value of the timing offset $a$ is determined further processing of the tap value coefficients results in determination of the timing offset sign.

It may be appreciated that when the timing offset is equal to $\frac{1}{2}$ chip interval the sign of the offset becomes irrelevant since the receiver chip timing could be adjusted by one half chip interval in positive or negative direction resulting in synchronization with transmitter chip timing. Furthermore, positive chip timing offset of greater than $\frac{1}{2}$ chip timing offset could be expressed in terms of a negative complementary offset. For example, a positive $\frac{3}{4}$ timing offset could be expressed as a $-\frac{1}{4}$ timing offset and so on. Therefore, the timing offset $a$ would be a value within the range of zero to $\frac{1}{2}$ with the offset timing sign signifying the leading or trailing status of the receive chip timing offset.

Figure 10:
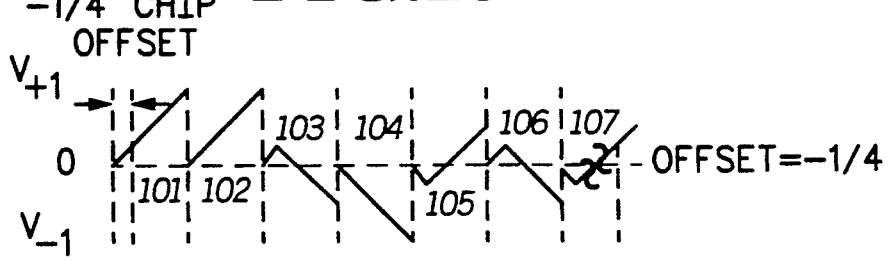

Referring to FIG. 10, a receiver chip timing offset of $-\frac{1}{4}$ is shown. In order to better understand the process by which sign of the timing offset may be determined, the $-\frac{1}{4}$ timing offset of FIG. 10 will be compared with the $+\frac{1}{4}$ timing offset condition of FIG. 9. As can be seen in FIG. 9, during consecutive intervals 901, 902 and 903, when there is a transition from a $V_{+1}$ to a $V_{-1}$ (chip transition of positive potential to negative potential), the outputs of the chip matched consist of $V_{+1}$, $\frac{1}{2}$ $V_{+1}$, and $V_{-1}$. Due to the fact that the timing offset is positive in FIG. 9, after completion of a positive to negative chip transition occurring during intervals 601 to 602 (shown in FIG. 6), the output of the chip matched filter reaches a positive polarity, i.e., $\frac{1}{2}$ $V_{+1}$, at the end of interval 902. Conversely, in FIG. 10, because of negative timing offset, the output of the chip matched filter after completion of the same positive to negative chip transition would reach a negative polarity, i.e., $\frac{1}{2}$ $V_{-1}$, at the end of interval 103. Therefore, the sign of the timing offset could be determined based on the polarity of at least one of the tap coefficient potentials after one or more chip transitions. It may be appreciated that the same type of analysis is applicable to a negative to positive chip transition as well as other chip sequence arrangements.

The tap coefficient potential processing needed for determination of the chip timing offset $a$ and its sign could all be accomplished by appropriately programming the digital signal processor 320 utilizing well known signal processing techniques. As such the signal processor 320 includes means for determining chip timing offset based on the tap coefficient potentials as well as the means for determining sign of the chip timing offset based on the polarity of at least one of the tap coefficients after a chip transition.

Upon determination of the chip timing offset and sign thereof, the receiver chip timing could be adjusted to synchronize it with the transmitter chip timing. It should be noted that because of existence of multiple access interference the chip timing offset determination according to the present invention produces an estimate and not the precise chip timing offset. Therefore, there may still be a need to perform some minor correlation routines to complete chip synchronization. However, the amount of time needed to perform such routines is minimal. Once the chip timing synchronization is performed, the receiver 20 commences a bit timing synchronization process during a bit timing interval.

BIT TIMING OFFSET

Because of redundancy of the training sequence no synchronization is necessary during training interval. Assuming that the chip timing is synchronized, bit timing offset between the receiver and the transmitter during the training interval causes the resulting tap coefficients $C_1$-$C_n$, which represents the despreading chip sequence, to be cyclically shifted by a corresponding number of chips. Therefore, the receiver bit timing offset may be expressed in terms of chip numbers. When the DS-SS communication signal 30 is despreaded, after the determination of tap coefficient $C_1$-$C_n$ the resulting decoded DS-SS communication signal includes bit timing information which may be extracted in conjunction with the transmitter bit timing sequences 33 of FIG. 2.

After the training interval, the summer output 408 provides a representation of the decoded DS-SS communication signal 30. Therefore, the summer output 408 is processed to determine the bit timing offset.

It has been determined that the following relationship exists between the bit timing offset and the summer output:

$$y_t = b_{t-1}(n-m) + b_t(m) \qquad \text{Equation (2)}.$$

Where $y_t$ is the summer output at time t, $b_{t-1}$ and $b_t$ are decoded bits at times t−1 and t, m is bit timing offset in terms of number of chips, and n is number of chips per bit. When $b_{t-1}$ and $b_t$ are consecutive non-alternating bits, then $y_t$ is equal to their bit state, i.e., either +1 or −1. When $b_{t-1}$ and $b_t$ are alternating bits then $y_t = +(n-2m)$ if $b_{t-1} = +1$ and $b_t = -1$, and $y_t = -(n-2m)$ if $b_{t-1} = -1$ and $b_t = +1$. Accordingly, the bit timing offset information may be extracted by processing the summer output 408 after an alternating transition from one bit state to another bit state has occurred.

Figure 11:
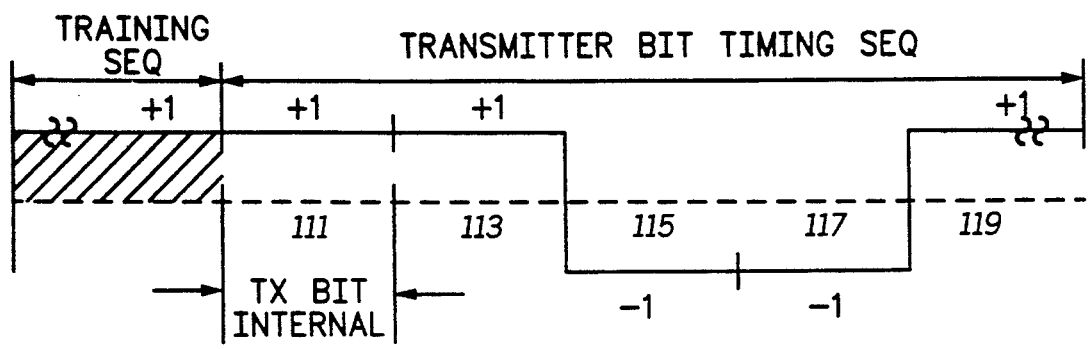
FIG. 11 is a timing diagram of decoded DS-SS communication signal of FIG. 2.

Referring to FIG. 11, a decoded communication signal upon completion of the training interval and after determination of the despreading sequence is shown. As shown, the transmitter bit timing sequence 33 follows the training sequence. The transmitter bit timing sequence when received, provides the receiver 20 with the capability of detecting start of the transmitter bit interval. The transmitter bit timing sequence 33 comprises a sequence of alternating bit sequence with at least two consecutive bits having alternating states such that the state of one bit changes from one interval to the succeeding interval. In other words, a transition from $+1$ to $-1$, or vice versa, would exist between two consecutive bits from a first bit interval to the subsequent second bit interval. The transitions occurring over the transmitter bit timing sequence are critical because they are indicative of transmitter bit timing which is used in the receiver to determine the bit timing offset according to equation 2. As shown, an exemplary transmitter bit timing sequence may consist of the sequential bit states of $+1, +1, -1, -1, +1, +1, -1, -1$ occurring respectively in transmitter bit intervals 111, 113, 115, 117. It may be appreciated that the transmitter bit timing sequence may be of other variety of sequences, such as alternating bit sequence of $+1, +1, -1, +1, +1, -1$ as long as the sequence consists of transitions conveying transmitter bit timing information.

In the preferred embodiment, the receiver bit timing offset is determined after the training interval by integrating, over a first receiver bit interval, non-alternating bits of the decoded communication signal to produce a first result, and integrating over, a second receiver bit interval, alternating consecutive bits of the decoded communication signal to produce a second result. Thereafter, the first result is compared with the second result to determine the bit timing offset. The bit timing offset is determined by determining half the difference between the first result and the second result. It should be noted that the first result may be a prestored constant value representing the result of integration over non-alternating bits.

Figure 12:
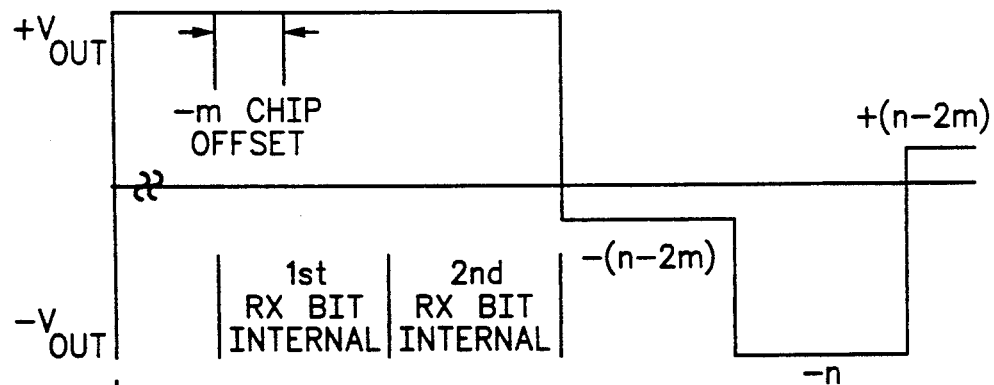
FIGS. 12-13 are exemplary timing diagrams of out put of a summer used in spreading equalizer of FIG. 5 showing effects of various bit timing offsets.

The above concept may be better understood by referring to FIG. 12, where the summer output in a situation where the bit timing offset is $-m$ chips is shown. The negative sign of the timing offset indicates that the transmitter bit interval occurs before the receiver bit interval. The normalized output of the summer at the end of the first receiver bit intervals which occurs during the consecutive non-alternating bit stakes of $+1$, corresponding transmitter bit intervals 111 and 113, is equal to n, i.e. first result=n. The normalized summer output 408 at the end of the second receiver bit interval after integration during the alternating bit transition from $+1$ to $-1$ occurring on the transmitter bit interval 115 is equal to $-(n-2m)$, i.e., second result is $n-2m$. Therefore, by determining half the difference between absolute values of the first result and the second result the absolute value of the bit timing offset m is determined.

Figure 13:
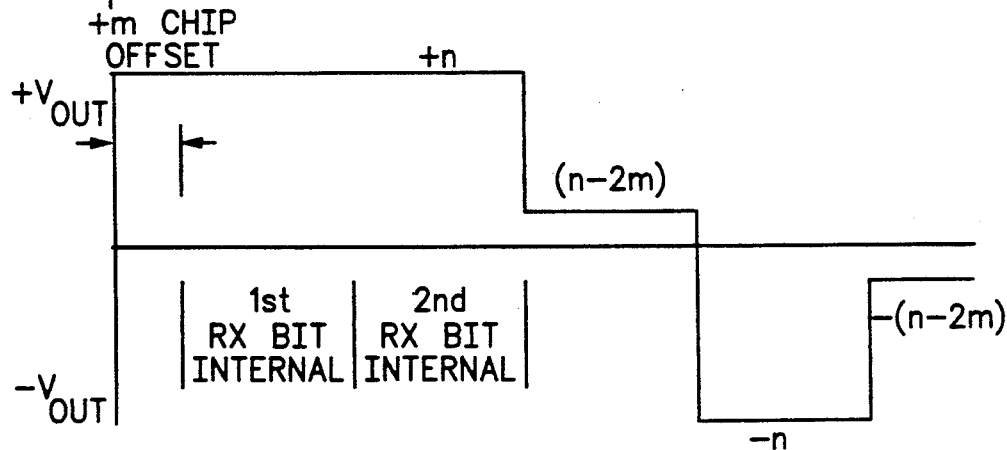

The absolute value of the chip timing offset as determined above does not indicate sign of the receiver bit timing offset. In order to better understand the process by which the sign of bit timing offset is determined, an exemplary situation where the receiver bit timing is equal to $+m$ chips as shown in FIG. 13, is compared to the situation of FIG. 12 where the receiver bit timing is $-m$ chips. In FIG. 12, during a positive to negative transition (occurring during transmitter bit intervals 113 to 115), a negative bit timing offset produces a first result which has a positive polarity and a second result which has a negative polarity after the transition. Whereas, in FIG. 13, during the same positive to negative transition, a positive bit timing offset produces a positive polarity first result and second result. In another example, referring to FIG. 12th negative to positive transition from the transmitter bit interval 117 to 119, produces a negative polarity first result (the polarity of the summer output as a result of integration of two consecutive $-1$s of intervals 115 and 117), and a positive second result when the bit timing offset sign is negative. In FIG. 13, during the same negative to positive transition, a positive bit timing offset sign produces negative first and second results. As such, it may be appreciated that the sign of the bit timing offset may be determined by determining the type of transition, i.e. positive to negative or vice versa and comparing the polarities of the first result and the second result. Accordingly, of the bit timing offset is determined by comparing results of integration produced during consecutive nonalternating bits with that obtained during alternating bits.

Upon determination of the bit timing offset and sign thereof, the receiver bit timing could be adjusted to synchronize it with the transmitter bit timing. It should be noted that because of existence of multiple access interference the bit timing offset determination according to the present invention produces an estimate and not the precise bit timing offset. Therefore, there may still be a need to perform some minor correlation routines to complete bit synchronization. However, the amount of time needed to perform such routines is minimal. Once the bit timing synchronization is completed, the receiver 20 commences to decode user information sequence.

As outlined above, the adaptive communication system 100 uniquely communicates DS-SS communication signal 30 from the transmitter 10 to the receiver 20 in three sequential intervals: first the training interval, then the chip timing interval and finally the bit timing interval. The unique communication sequence of the present invention greatly facilitates receiver and transmitter timing synchronization in an adaptive CDMA communication system which results in quick establishment of communication links between CDMA receivers 20 and the CDMA transmitters 10. First during the training interval, the which includes the training bit sequence. The DS-SS communication signal 30 is decoded by adaptively determining, based on the training bit sequence, tap coefficients of the equalizer which represent the despreading chip sequence. As result of the training process, the effects of multiple access interfering signals are eliminated paving the way for chip timing and bit timing offset determination. Because the bit timing offset information can be easily extracted following the chip timing offset determination, therefore, after training interval the chip timing offset is determined during the chip timing interval. The chip timing offset is determined based on the potential of the representation of the despreadingchip sequence. Finally, during the bit timing interval, the bit timing offset is determined based on the decoded DS-SS communication signal and the transmitter bit timing sequence which is transmitted following the training bit sequence.

As discussed above, the bit timing synchronization in the adaptive CDMA communication system 100 is achieved mainly by decoding and integrating the transmitter bit timing sequence of the DS-SS communication signal without performing complex correlation routines. Integration and the necessary processing of the decoded communication signal and derivation of the bit timing offset requires substantially less time than the more time consuming correlation processing proposed in the prior art. As a result, a quick communication link between the receiver and the transmitter is established.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

We claim:

1. In a direct sequence CDMA spread spectrum communication system, wherein spread spectrum communication signals comprising binary bits coded with spreading chip sequences are communicated between a transmitter and a receiver; a bit synchronization method for synchronizing receiver bit timing with transmitter bit timing comprising the steps of:
   a) transmitting a direct sequence spread spectrum communication signal (DS-SS) including a redundant training bit sequence followed by a transmitter bit timing sequence coded with a spreading chip sequence;
   b) despreading the DS-SS communication signal based on said redundant training bit sequence to provide a decoded communication signal; and
   c) determining receiver bit timing offset based on the transmitter bit timing sequence and the decoded communication signal.

2. The method of claim 1, wherein said step of despreading the DS-SS communication signal includes the step of:
   adaptively determining a representation of despreading chip sequence using an equalizer.

3. The method of claim 2, wherein the DS-SS communication signal includes consecutive non-alternating bits and the transmitter bit timing sequence comprises alternating bits wherein the state of at least one of two consecutive bits is changed from one bit interval to the succeeding bit interval.

4. The method of claim 3, wherein said step of determining bit timing offset includes the steps of:
   integrating the decoded communication signal over a receiver bit interval during alternating bits.

5. The method of claim 4, wherein said step of determining bit timing offset includes the steps of:
   producing integration of the decoded communication signal over a receiver bit interval during the consecutive non-alternating bits; and
   determining sign of the bit timing offset by comparing results of integrations produced during consecutive non-alternating bits with that obtained during alternating bits.

6. In a direct sequence CDMA receiver system capable of receiving spread spectrum communication signals comprising binary bits coded with a spreading chip sequence from a transmitter; a bit synchronization method for synchronizing receiver bit timing with transmitter bit timing comprising the steps of:
   a) receiving a redundant training bit sequence;
   b) despreading the DS-SS communication signal based on said redundant training bit sequence to provide a decoded communication signal;
   c) receiving a transmitter bit timing sequence; and
   d) determining receiver bit timing offset based on the transmitter bit timing sequence and the decoded communication signal.

7. The method of claim 6, wherein said step of despreading the DS-SS communication signal includes the step of:
   adaptively determining a representation of despreading chip sequence using an equalizer.

8. The method of claim 7, wherein the decoded communication signal includes consecutive non-alternating bits and the transmitter bit timing sequence includes alternating bits wherein the state of at least one of two consecutive bits is changed from one bit interval to the succeeding bit interval.

9. The method of claim 8, wherein said step of determining chip timing offset includes the steps of:
   integrating the decoded communication signal over a first receiver bit interval during the consecutive non-alternating bits to produce a first result; and
   integrating the decoded communication signal over a second receiver bit interval during alternating bits to produce a second result.

10. The method of claim 9, wherein said step of determining chip timing offset includes the steps of:
    determining sign of the bit timing offset by comparing results of integrations produced during consecutive non-alternating bits with that obtained during alternating bits.

11. A CDMA communication system for communicating direct sequence spread spectrum communication signals comprising:
    a transmitter for transmitting a direct sequence spread spectrum (DS-SS) communication signal including a redundant training bit sequence followed by a transmitter bit timing sequence coded with a spreading chip sequence;
    a receiver for receiving said DS-SS communication signal including:
    despreading means for despreading the DS-SS communication signal based on said redundant training bit sequence and providing a decoded communication signal; and
    determination means for determining receiver bit timing offset based on said decoded communication signal and said transmitter bit timing sequence.

12. The communication system of claim 11, wherein said despreading means comprises an equalizer for adaptively determining a representation of a despreading chip sequence.

13. The communication system of claim 12, wherein the decoded communication signal includes consecutive non-alternating bits and the transmitter bit timing sequence includes alternating bits wherein the state of at least one of two consecutive bits is changed from one bit interval to the succeeding bit interval.

14. The communication system of claim 13, wherein said equalizer includes a summer for integrating the decoded communication signal over a first receiver bit interval during the consecutive non-alternating bits to produce a first result and for integrating the decoded communication signal over a second receiver bit interval during alternating bits to produce a second result.

15. The communication system of claim 13, wherein said determination means includes means for determining sign of the bit timing offset by comparing the first result with the second result.

16. A direct sequence CDMA receiver, comprising:
    means for receiving a direct sequence spread spectrum communication signal including a redundant training bit sequence followed by a transmitter bit timing sequence coded with a spreading chip sequence;

a despreading means for despreading the DS-SS communication signal based on said redundant training bit sequence and providing a decoded communication signal; and determination means for determining receiver bit timing offset based on said decoded communication signal and said transmitter bit timing sequence.

17. The receiver of claim 16, wherein said wherein said despreading means comprise an equalizer for adaptively determining a representation of a despreading chip sequence.

18. The receiver of claim 17, wherein the decoded communication signal includes consecutive non-alternating bits and the transmitter bit timing sequence includes alternating bits wherein the state of at least one of two consecutive bits is changed from one bit interval to the succeeding bit interval.

19. The receiver of claim 18, wherein said equalizer includes a summer for integrating the decoded communication signal, over a first receiver bit interval, during the consecutive non-alternating bits to produce a first result and for integrating the decoded communication signal, over a second receiver bit interval, during alternating bits to produce a second result.

20. The receiver of claim 19, wherein said determination means includes means for determining sign of the bit timing offset by comparing the first result with the second result.

* * * * *